(12) United States Patent
Alexander et al.

(10) Patent No.: US 8,408,645 B2
(45) Date of Patent: Apr. 2, 2013

(54) ACTIVE HEAD RESTRAINT UTILIZING SOLENOID ACTIVATION AND BAR LINKAGE TRANSMISSION

(75) Inventors: Paul W. Alexander, Ypsilanti, MI (US); Leigh A. Berger, Brighton, MI (US); Michael G. Carpenter, Romeo, MI (US); Dale M. Drew, Grosse Pointe Farms, MI (US); Michael E Kilpinen, Rochester Hills, MI (US); Clayton J Hayes, Romeo, MI (US); James A Smith, Armada, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 392 days.

(21) Appl. No.: 12/792,484

(22) Filed: Jun. 2, 2010

(65) Prior Publication Data

US 2010/0314918 A1 Dec. 16, 2010

Related U.S. Application Data

(60) Provisional application No. 61/186,891, filed on Jun. 14, 2009.

(51) Int. Cl.
*B60N 2/48* (2006.01)
(52) U.S. Cl. .................................. 297/216.12; 297/410
(58) Field of Classification Search ............. 297/216.12, 297/408, 410
See application file for complete search history.

(56) References Cited

U.S. PATENT DOCUMENTS

| | | | | |
|---|---|---|---|---|
| 6,761,403 B2 * | 7/2004 | Pal et al. | ............... | 297/216.12 X |
| 7,111,901 B2 * | 9/2006 | Schlierf et al. | ........... | 297/216.12 |
| 7,770,967 B2 * | 8/2010 | Hirota et al. | ............. | 297/216.12 |
| 7,992,933 B2 * | 8/2011 | Yetukuri et al. | ..... | 297/216.12 X |
| 8,100,472 B2 * | 1/2012 | Humer et al. | ........ | 297/216.12 X |

* cited by examiner

*Primary Examiner* — Anthony D Barfield

(57) ABSTRACT

An active head restraint for supporting the head of an occupant, includes a shell, and an actuator disposed within the shell, wherein the actuator further includes a spring-biased bar linkage system pivotally coupled to the shell, a radial ratcheting sector coupled to the linkage system, a pawl selectively engaging the sector, and a solenoid drivenly coupled to the pawl, and configured, when activated, to cause the pawl to disengage the sector.

17 Claims, 5 Drawing Sheets

US 8,408,645 B2

ACTIVE HEAD RESTRAINT UTILIZING SOLENOID ACTIVATION AND BAR LINKAGE TRANSMISSION

RELATED APPLICATIONS

This patent application claims priority to and benefit from U.S. Provisional Patent Application Ser. No. 61/186,891, entitled "ACTIVE HEADREST UTILIZING SOLENOID ACTIVATION AND BAR LINKAGE TRANSMISSION," filed on Jun. 14, 2009, the disclosure of which is incorporated by reference herein.

BACKGROUND OF THE INVENTION

1. Field of the Invention

The present disclosure relates to adjustable head restraint assemblies, and more particularly, to an adjustable head restraint having a solenoid actuator and bar-linkage deployment system.

2. Discussion of Prior Art

Autonomously manipulable (or "active") head restraints have been developed that change absolute positioning, so as to selectively reduce the intermediate distance between the head restraint and the head of an occupant when desired. In an automotive setting, for example, manipulation may be autonomously effected when a crash event is detected or predicted; or where on-demand activation is provided according to operator preference. Conventional head restraints, including those with partially moving or telescoping shells, those presenting separate release and locking actuators, and those that provide limited adjustability, typically employ complex architecture. These head restraints present various concerns in the art, including a crowded interior region, and a large plurality of moving parts resulting in greater manufacturing, repair and replacement costs.

BRIEF SUMMARY OF THE INVENTION

This invention addresses these concerns, and presents a novel head restraint that employs manually charged spring actuation, a solenoid release, and a bar linkage system to selectively manipulate (e.g., adjust the positioning or compliance of) the head restraint. As such, the head restraint described herein is useful for autonomously providing increased protection to the occupant. Further, the disclosed head restraint offers a lower profile, and improved adjustability in comparison to conventional active head restraints. Finally, the inventive head restraint presents unitary displacement, and a more efficient actuator that combines releasing and locking functionality.

In general, an active head restraint adapted for use with a seat, and to selectively support the head of an occupant is presented. The head restraint includes an exterior shell defining an interior space and outer surface configured to engage the head of the occupant. An actuator is disposed within the space, and operable to adjust the distance between the surface and head. The actuator includes a bar linkage system presenting at least one selectively deployable swing arm pivotally coupled to the seat and shell, such that pivoting the arm causes the shell to translate relative to the seat. The actuator further includes a solenoid operable to enable the arm to pivot, when exposed to an electric current. Finally, the head restraint, and more particularly, the actuator is communicatively coupled to a power source operable to generate the current.

As such, a second aspect of the invention presents a method of autonomously translating a head restraint between stowed and deployed positions. The method generally includes the steps of detecting a condition or event, activating a solenoid, releasing stored energy as a result of activating the solenoid, causing a bar-linkage system to swing from a first configuration, as a result of releasing the energy, and causing the head restraint to translate from the stowed and to the deployed position as a result of causing the system to swing.

The above described and other features are exemplified by the following figures and detailed description.

BRIEF DESCRIPTION OF THE DRAWINGS

Preferred embodiments of the invention are described in detail below with reference to the attached drawing figures of exemplary scale, wherein.

DETAILED DESCRIPTION

Figure 1:
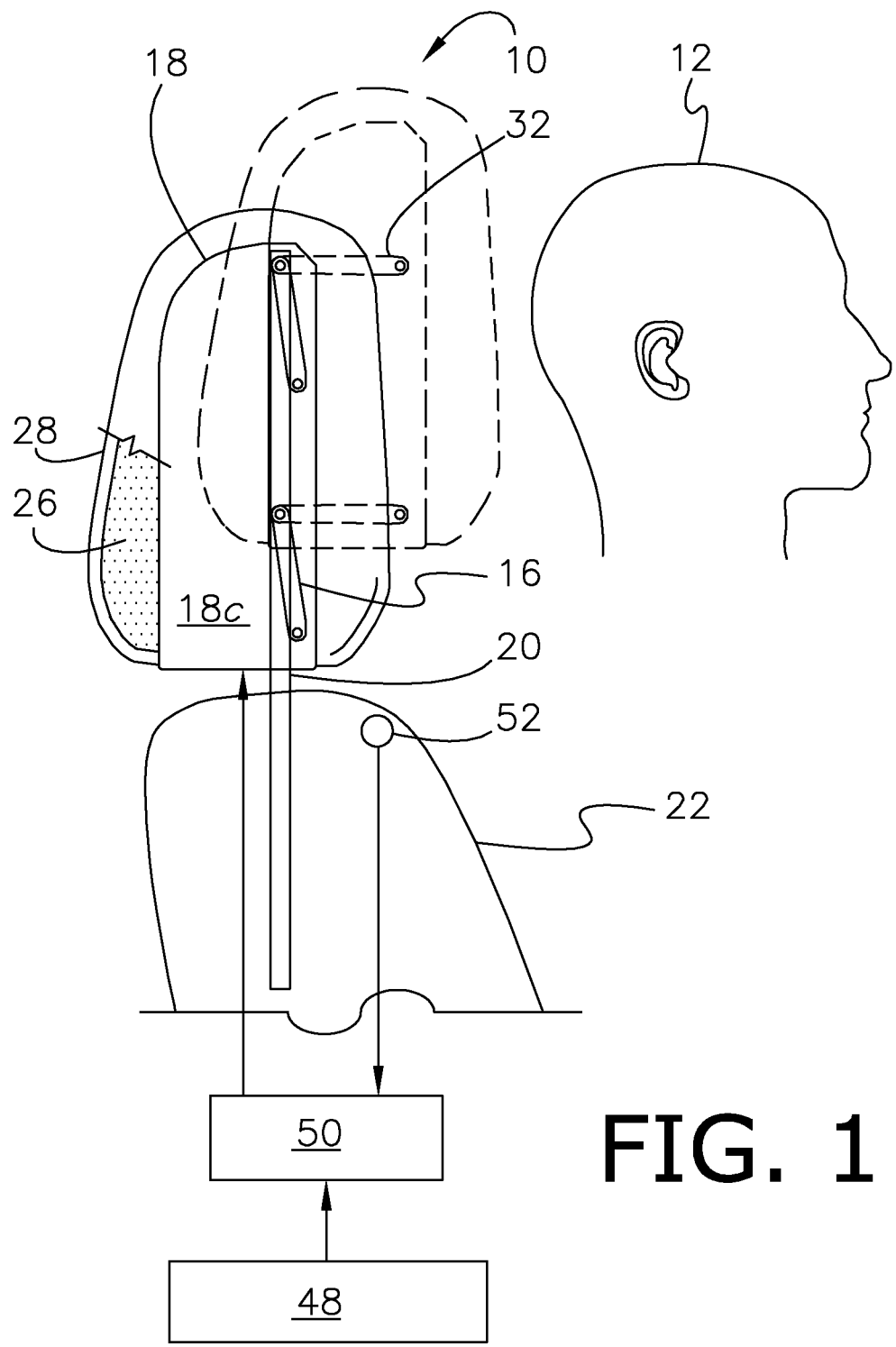
FIG. 1 is a side elevation of an active head restraint translatable between stowed (solid-line type) and deployed (hidden-line type) conditions, and the head of an occupant, particularly illustrating a four-bar linkage system, in accordance with a preferred embodiment of the invention.

Disclosed herein is an active head restraint (or "headrest") 10 adapted to selectively support the head 12 of an occupant (FIG. 1). The active head restraint 10 disclosed herein can be employed in front or rear seats, child seats, and the like, and in association with various applications, such as vehicular and aviation transportation, etc. The head restraint 10 includes a solenoid actuator 14 and bar linkage system 16 that cooperate to manipulate (e.g., translate, reposition, etc.) at least a portion of the head restraint 10 (FIGS. 1-5c) from a normal or stowed position to a deployed position wherein the spacing between the head restraint 10 and head 12 is reduced. As further described herein, the preferred head restraint 10 is configured to shift autonomously from the stowed and to the deployed position upon detection of an event or condition, and/or on-demand.

As shown in FIGS. 1-4, the head restraint 10 includes a shell 18 preferably formed of a front contact portion 18a and a back portion 18b, which interconnect (e.g., through snaps) and cooperate to form an interior space 18c. For example, a one-piece outer folding clamshell may be used, wherein the front portion 18a is the portion of the head restraint 10 proximate the head 12. The preferred shell 18 defines a cutout 19 (FIG. 2) that provides access to the interior space 18c, so that the actuator 14 may be manually accessed without removing the shell 18. As shown in FIG. 1, it is appreciated that the shell 18 advantageously moves in unison, as an integrated body. In lieu of displacing the head restraint 10, it is appreciated that the system 16 and actuator 14 may be alternatively configured to bear against, so as to provide additional resistance or energy absorption capability to, an otherwise stationary front surface of the head restraint 10. That is to say the system 16 and actuator 14 may also be used to adjust the stiffness or geometric shape of the head restraint 10.

The head restraint 10 is supported by at least one structural support post 20 slidably disposed within the seatback 22, and fixedly secured relative thereto via locking means (not shown). To enable movement relative to the posts 20, the shell 18 defines a lower opening 18d through which each post 20 enters the space 18c and is able to translate. More preferably, the shell 18 defines slotted openings 18d (FIG. 2) having a width congruent to the post diameter, so as to effect linear translation. The preferred head restraint 10 further includes a padding material 26 exterior to and forming superjacent layers with the shell 18, and an outer covering 28 (of soft durable material) encasing the padding material 26 to define the overall shape of the head restraint 10. The preferred padding 26 and covering 28 are removable, so as to enable access to the actuator 14 through the cutout 19.

The shell 18 may be in pivotal communication with the structural support post 20, or, fixedly secured thereto. In the illustrated embodiment, for example, rod straps 29 may securely interconnect the head restraint 10 and posts 20, or be configured to enable the head restraint 10 to be manually rotated to the extent allowed by the lower slot openings 18d, so as to provide further adjustability through tilting.

The structural support posts 20 can take many forms and are not intended to be limited to that shown. For example, it is appreciated that a wishbone or goal type post structure can be used. Moreover, more or less than two posts 20 can be employed. Finally, the fixed structure of the preferred head restraint 10 further includes a main carrier plate 30 (FIGS. 2-4) that is secured to the posts 20 and provides a flat planar surface, which serves as a base for the actuator 14, and bar-linkage system 16.

The preferred bar-linkage deployment system (i.e., "bar linkage") 16 comprises at least one swing arm 32, and more preferably, a plurality of laterally paired swing arms 32. As shown in FIG. 1, the swing arms 32 are pivotally coupled to the shell 18 and fixed structure (e.g., posts 20, carrier plate 30, etc.), preferably at or near their distal ends, for example, through dowel pins (not shown). The arms 32 are inter-linked to effect congruent motion. More preferably, a parallel four-bar linkage system with equivalent arm lengths and orientations 16 may be employed, consisting of cross-bars 34 between lateral swing arms 32, and vertical braces (not shown) between vertically spaced arms 32. In the illustrated embodiment, the preferably rigid side walls of the shell 18 supplants the vertical braces. For each set of lateral arms 32, the pivot axis defined by the fixed structure and arms 32 is fixed relative to the plate 30, while the outer pivot axis connected to the shell 18 is free to translate. As such, when the swing arms 32 are caused to pivot in a first direction, the head restraint 10 is driven outward (e.g., away from the posts 20) and upward towards a deployed position, as shown by hidden-line type in FIG. 1.

In the illustrated embodiment, deployment and/or stowage is provided by releasing energy stored within upper and/or lower torsion springs 36,38. The spring(s) 36,38 are preferably sized such that translation is performed in a controlled manner, and likewise present a predetermined k-value, leg angle, and leg length. The mandrels of the springs 36,38 are coaxially aligned and preferably configured to present a minimal spacing with the cross-bars 34. It is appreciated that the lower spring 38 may also serve as the lower link arm. Alternatively, it is also appreciated that other types of springs (e.g., extension springs, etc.), or biasing elements may be used.

In the preferred embodiment, the actuator 14 includes a pawl ("locking plate") 40 and ratcheting sector ("pendulum", or "ratchet") 42 that cooperate to prevent back-drive when released and engaged. The sector 42 is pivotally coupled to the carrier plate 30 and caused to swing within a window defined thereby, when the arms 32, which are fixedly coupled to the sector 42, are caused to pivot by the released springs 36,38.

Figure 2:
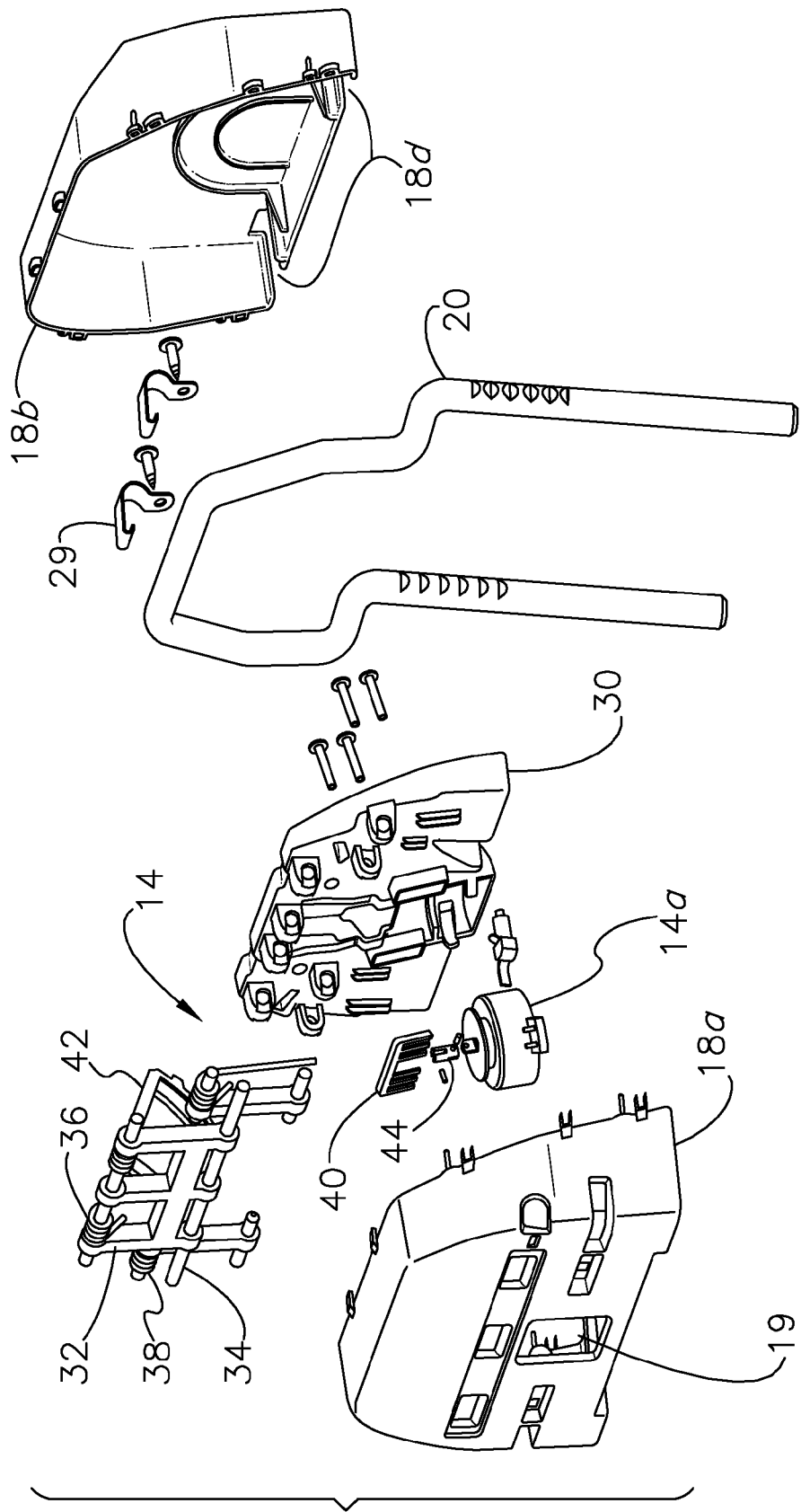
FIG. 2 is an exploded view of an active head restraint including a solenoid actuator and four bar linkage system comprising an upper link arm, upper torsion springs, and lower spring arm, and further illustrating a main carrier plate, shell, and seat post, in accordance with a preferred embodiment of the invention.
Figure 3:
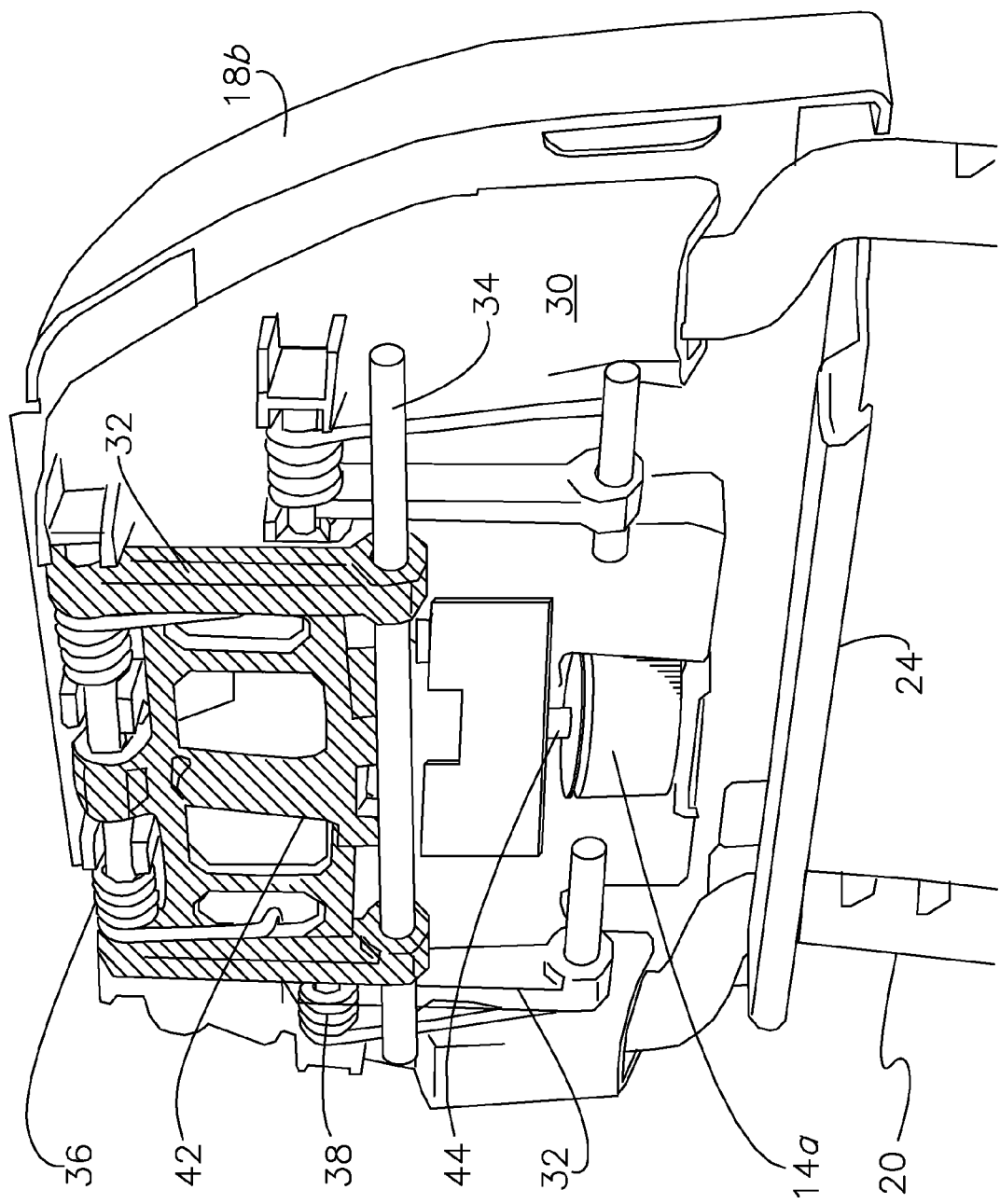
FIG. 3 is a front perspective view of the inner-workings of the head restraint shown in FIG. 2, particularly illustrating the shell back, carrier plate, bar-linkage system, post, and solenoid actuator, in accordance with a preferred embodiment of the invention.
Figure 4:
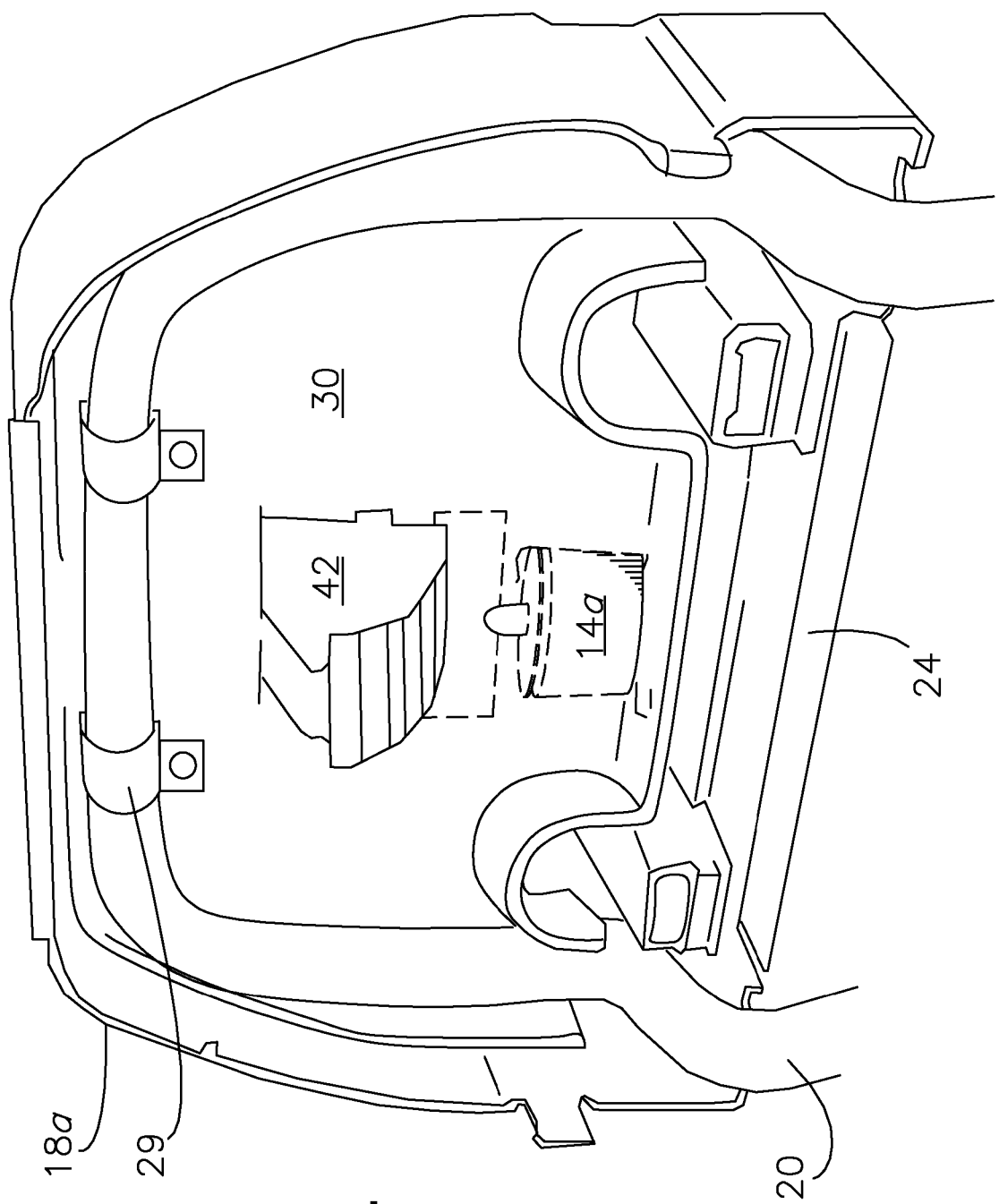
FIG. 4 is a rear perspective view of the inner-workings of the head restraint shown in FIG. 2, particularly illustrating the shell front, carrier plate, ratcheting sector, and solenoid/pawl (shown in hidden line type), in accordance with a preferred embodiment of the invention.

The pawl 40 is coupled to and driven by the solenoid 14a; and configured to selectively engage the sector 42. More particularly, as shown in FIG. 2 the solenoid 14a is of the type including a telescoping and outwardly biased plunger 44, and the pawl 40 presents a rectangular planar body that defines a U-shaped joint 46, within which the plunger 44 extends. For example, the U-joint 46 may be connected to the solenoid 14a through a steel pin (not shown), allowing for slight misalignment of the plunger 44 and pawl 40. The plunger 44 engages the pawl 40 at a predetermined angle that minimizes the actuation force necessary to disengage the pawl 40 from the sector 42 and slide the pawl 40 within a guide track, which aligns with the plunger 44.

Figure 5C:
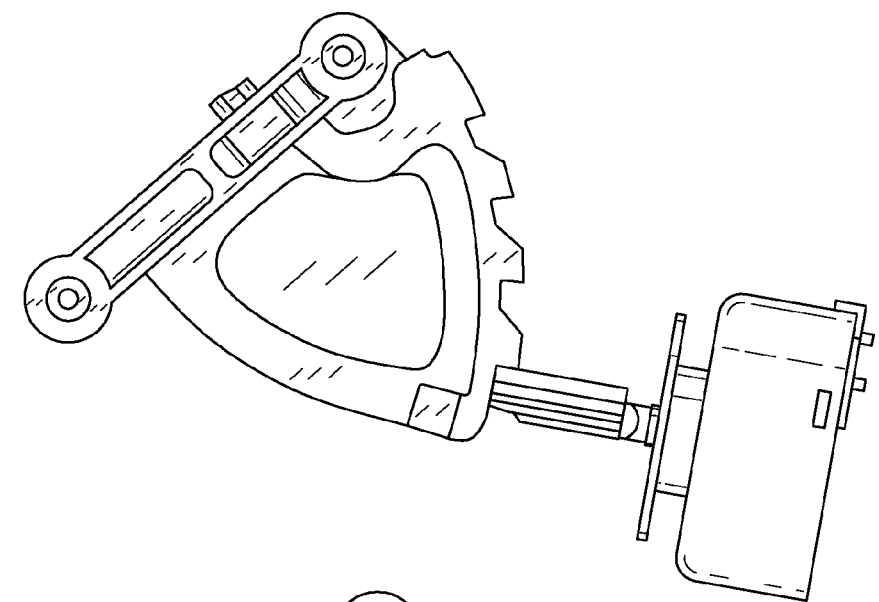
FIG. 5c is a side elevation of the sector and pawl shown in FIGS. 5a,b, wherein the sector has been fully deployed, and the pawl is in a locked position.
Figure 5B:
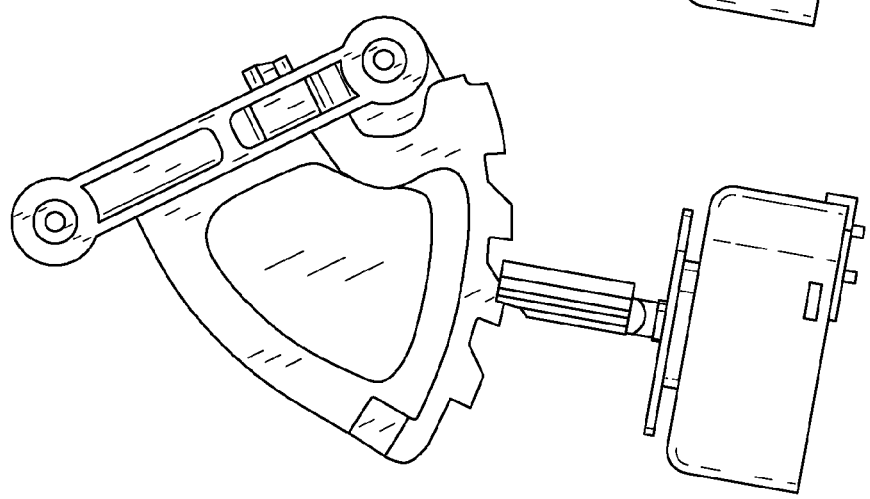
FIG. 5b is a side elevation of the sector and pawl shown in FIG. 5a, wherein the solenoid has been activated, the pawl caused to release the first tooth, and the sector caused to pivot, such that the pawl engages the sloped surfaces of the subsequent teeth.
Figure 5A:
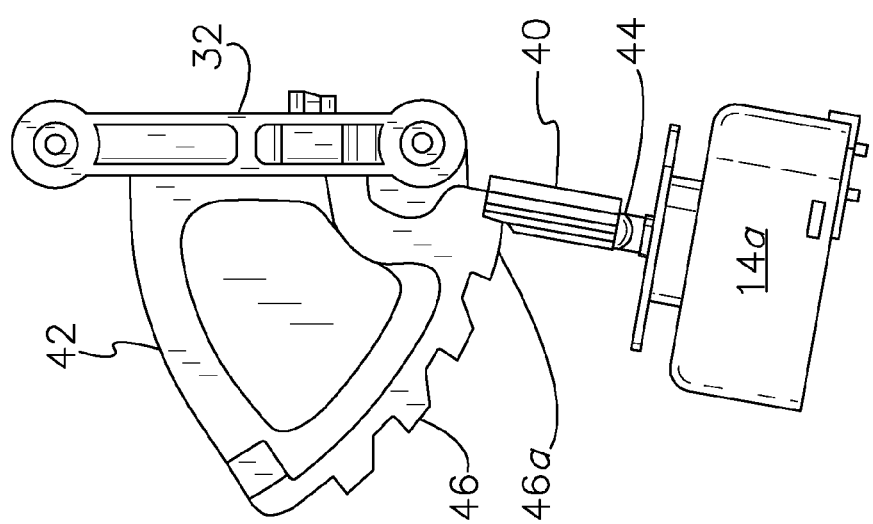
FIG. 5a is a side elevation of the sector having a plurality of sloped teeth engaging the solenoid and pawl, wherein the solenoid and pawl engage a first tooth, so as to be locked in the stowed position, in accordance with a preferred embodiment of the invention.

The sector 42 presents a plurality of teeth 46, including a first locking tooth 46a followed by plural ratcheting teeth. The first tooth 46a presents orthogonal surfaces that form superjacent and normally engaging surfaces with the pawl 40 in both directions. As such, when the first tooth 46a is engaged, the pawl 40 and sector 42 prevent relative rotation past each other (FIG. 5a), which locks the head restraint 10, for example, in the stowed position. As shown in the illustrated embodiment, the forward surface of the ratcheting teeth 46 present a slope, so as to engage the pawl 40 at an angle. The resultant force vector produces a vertical component sufficient to drive the plunger 44 downward (FIG. 5b), thereby enabling the teeth 46 and sector 42 to continue to travel in the first direction. The ratcheting teeth 46 present an orthogonal rearward surface, such that once the pawl 40 passes a particular tooth 46, it is prevented from back driving past that tooth. Thus, the pawl 40 and sector 42 slidingly slip past each other in one direction but inter-lock in the other, so as to support the head 12 at incremental points along its translation. If unobstructed, the head restraint 10 will fully deploy (FIG. 5c).

As previously stated, the actuator 14 overcomes many of the disadvantages of conventional active head restraint actuators. For example, a relatively smaller volume, lower power requirement, and increased distributed actuation capability are some of the solutions offered by the inventive actuator 14. The actuator 14 includes a solenoid 14a that is configured to cause the release of energy that results in the displacement of the swing arms 32. More particularly, when an electric current is caused to flow within the coil (not shown) of the solenoid 14a, the magnetic flux generated thereby establishes poles within the plunger 44. The poles cause the plunger 44 to translate inward pulling the pawl 40 away from the sector 42.

Thus, it is appreciated that a power source 48 is communicatively coupled to the actuator 14 (e.g., through a wire harness fed through the head restraint 10 and plate 30), and operable to generate the electric charge (FIG. 1) that activates the solenoid 14a. In an automotive application, for example, the source 48 may be the vehicle charging system or a capacitor operable to effect a sufficient discharge of energy when desired.

In a preferred embodiment, the preferred actuator 14 is autonomously triggered upon determining a condition wherein reducing the spacing between the head restraint 10 and head 12 and/or changing the compliance of the head restraint 10 is desired. For example, the head restraint 10 may be configured to respond to a dynamic load of the occupant generated by the inertial transfer during an automotive sudden stop event or to the determination of a pre-crash or crash condition. As such, a controller 50 and sensor 52 may be communicatively coupled to the actuator 14 and source 48 (FIG. 1). The controller 50 and sensor 52 are cooperatively configured to actuate the head restraint 10.

In the preferred embodiment shown in FIG. 1, a position sensor (capacitance, ultrasonic, radar, camera, and the like) 52 may be provided on the vehicle, e.g., near or within the seatback 22 to determine the position of the head 12. Here, the controller 50 may be designed to deploy or withhold deployment of the head restraint 10 based on the determined position of the head 12. For example, the anthropometry properties of the occupant, e.g., weight, height, size, weight distribution, and the like, as well as seated geometry, e.g., leaning back, leaning forward, head location with respect to the head restraint 10, and the like can be input variables for deploying the head restraint 10 at an appropriate time. Other exemplary sensors, including pressure sensors, displacement sensors, velocity sensors, accelerometers, and the like, which can be located in and about the vehicle seat and head restraint 10. Alternatively, the sensor 52 may present a manual input device, wherein the controller 50 is configured to receive input, and activate the solenoid 14a on-demand.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims. Further description, explanation, and exemplary embodiments offered by the various appendices attached hereto are hereby incorporated by reference, as exemplary but non-limiting teachings of the present invention.

What is claimed is:

1. An active head restraint adapted for use with a seat, and to selectively support the head of an occupant, said head restraint comprising:
   an exterior shell defining an interior space and outer surface configured to engage the head of the occupant;
   an actuator disposed within the space, and configured to adjust the distance or engagement between the surface and head, wherein the actuator includes a spring-biased bar linkage system presenting at least one selectively deployable swing arm pivotally coupled to the seat and shell, and further includes a solenoid communicatively coupled to said at least one arm, and configured to selectively enable the arm to pivot; and
   a power source communicatively coupled to the solenoid, wherein the shell defines a cutout adjacent the solenoid, so as to provide access to the space and enable the solenoid to be manually reset once deployed.

2. The head restraint as claimed in claim 1, wherein the system is configured such that pivoting said at least one arm in a first direction causes the shell to translate forward and upward.

3. The head restraint as claimed in claim 1, wherein the source is selected from the group consisting essentially of a vehicle charging system, and a capacitor having stored energy.

4. The head restraint as claimed in claim 1, wherein said actuator includes at least one torsion spring engaging said at least one arm, so as to bias said at least one arm and shell towards a deployed position.

5. The head restraint as claimed in claim 1, wherein the shell presents an integral unit, and the actuator is configured to displace the unit.

6. The head restraint as claimed in claim 1, wherein a plurality of inter-linked swing arms including at least one upper and lower pair is configured to congruently pivot and cooperatively cause the shell to translate.

7. The head restraint as claimed in claim 6, wherein the lower pair is replaced by at least one torsion spring pivotally coupled to the seat and shell, and said at least one spring is configured to release stored energy when the shell translates.

8. The head restraint as claimed in claim 1, further including a carrier plate secured to the seat, wherein said at least one swing arm is pivotally coupled to the plate and shell.

9. The head restraint as claimed in claim 8, wherein the plate is rotatably coupled to the seat, so as to enable the head restraint to be tilted.

10. The head restraint as claimed in claim 1 further comprising:
    a sensor operable to detect a sudden stop event or pre-crash condition; and
    a controller communicatively coupled to the sensor and solenoid, and configured to activate the solenoid when the condition or event is detected.

11. The head restraint as claimed in claim 1, further comprising:
    an input device intermediately coupled to the source and solenoid, and operable to cause the source to activate the solenoid on-demand.

12. An active head restraint adapted for use with a seat, and to selectively support the head of an occupant, said head restraint comprising:
    an exterior shell defining an interior space and outer surface configured to engage the head of the occupant;
    an actuator disposed within the space, and configured to adjust the distance or engagement between the surface and head, wherein the actuator includes a spring-biased bar linkage system presenting at least one selectively deployable swing arm pivotally coupled to the seat and shell, and further includes a solenoid communicatively coupled to said at least one arm, and configured to selectively enable the arm to pivot; and
    a power source communicatively coupled to the solenoid, wherein the actuator further includes a selectively engaged ratchet and pawl cooperatively configured to allow the head restraint to translate in a first direction and prevent translation in the opposite direction when released and engaged, the pawl is drivenly coupled to the solenoid, and the solenoid is configured to cause the pawl to release the ratchet, wherein the solenoid includes a telescoping plunger, and plunger engages the pawl at a predetermined angle.

13. The head restraint as claimed in claim 12, wherein said at least one arm and ratchet present an integral structure that congruently pivots.

14. The head restraint as claimed in claim 12, wherein the ratchet presents a pivotal sector defining a plurality of radially exterior teeth, at least a portion of the teeth present a sloped profile operable to cause the pawl and plunger to recede when the sector translates in the first direction.

15. A method of autonomously translating a head restraint between stowed and deployed positions, said method comprising the steps of:
 a. detecting a condition or event;
 b. activating a solenoid;
 c. releasing stored energy as a result of activating the solenoid;
 d. causing a bar-linkage system to swing from a first configuration, as a result of releasing the energy;
 e. causing the head restraint to translate from the stowed and to the deployed position as a result of causing the system to swing; and
 f. accessing the solenoid through a cutout defined by the head restraint, and manually causing energy to be re-stored, the bar-linkage system to return to the first configuration, and the head restraint to return to the stowed position.

16. The method as claimed in claim 15, further comprising:
 g. re-activating the solenoid prior to manually causing energy to be re-stored, the bar-linkage system to return to the first configuration, and the head restraint to return to the stowed position.

17. The method as claimed in claim 15, wherein step a) further includes the steps of detecting a sudden stop event or pre-crash or crash condition.

* * * * *